L. E. BAILEY.
MACHINE FOR LAYING MULCHES.
APPLICATION FILED AUG. 15, 1922.

1,436,139.

Patented Nov. 21, 1922.
3 SHEETS—SHEET 1.

L. E. BAILEY.
MACHINE FOR LAYING MULCHES.
APPLICATION FILED AUG. 15, 1922.

1,436,139.

Patented Nov. 21, 1922.
3 SHEETS—SHEET 2.

L. E. BAILEY.
MACHINE FOR LAYING MULCHES.
APPLICATION FILED AUG. 15, 1922.

1,436,139.

Patented Nov. 21, 1922.
3 SHEETS—SHEET 3.

Inventor.
L. E. Bailey
By Chas. J. Neill
Atty

Patented Nov. 21, 1922.

1,436,139

UNITED STATES PATENT OFFICE.

LESLIE E. BAILEY, OF WAHIAWA, TERRITORY OF HAWAII, ASSIGNOR TO HAWAIIAN PINEAPPLE COMPANY, LIMITED, OF HONOLULU, TERRITORY OF HAWAII, A CORPORATION OF HAWAII.

MACHINE FOR LAYING MULCHES.

Application filed August 15, 1922. Serial No. 582,059.

*To all whom it may concern:*

Be it known that I, LESLIE E. BAILEY, a citizen of the United States, and resident of Wahiawa, Oahu, in the Territory of Hawaii, have invented certain new and useful Improvements in Machines for Laying Mulches; and I do hereby declare the following to be a full, clear, and exact description of the invention, such as will enable others skilled in the art to which it appertains to make and use the same.

The invention relates to a new and useful machine for laying mulches, comprising long strips of paper or similar material, on the surface of the prepared ground, to enhance the growth of plants and repress the development of weeds and undesirable plants, as more particularly explained in re-issue Letters Patent No. 15,231, dated Oct. 22, 1921, granted to Charles F. Eckart, and has for its object to provide a simple and efficient machine adapted to be propelled over the surface of the prepared fields, to lay the mulching strips in regular rows and at the same time to open up a relatively shallow furrow into which the lateral edges of the mulch project, and to then redistribute the soil thrown out of the furrow over the lateral edges of the mulch to seal the latter and prevent the mulch being displaced by the wind or other natural elements, as will be more particularly explained in the annexed specification, predicated on the accompanying drawings in which:—

In the application of mulches to cultivated fields it has been customary to lay the mulches, which comprise long strips of paper of appropriate width done up in rolls, by hand to cover either the planting area of the plant rows, or to cover the area between the planting rows and, in order to prevent the mulches from being blown away by the wind or disturbed by other conditions, it has been customary to weight the mulches with stones, clods of earth, or to throw up a portion of the soil adjacent the lateral edges of the mulching strips over the said edges by a hoe or other similar implement. Both the handling of the mulches and the weighting of the same, to prevent their displacement, is tedious and expensive and requires some considerable skill on the part of the operators, and the present invention provides an effective means to insure not only an expeditious and accurate laying of the mulch, but also a simultaneous locking and securing of the edges thereof in the adjacent soil, so as to prevent the wind getting under the mulches and disturbing or displacing the same, and also to prevent damage to the fabric of the mulches, which was almost inevitable when it was attempted to secure the mulching strips in place by weighting them with stones or distributing the soil along the edges by means of hoes and the like.

Figure 1:
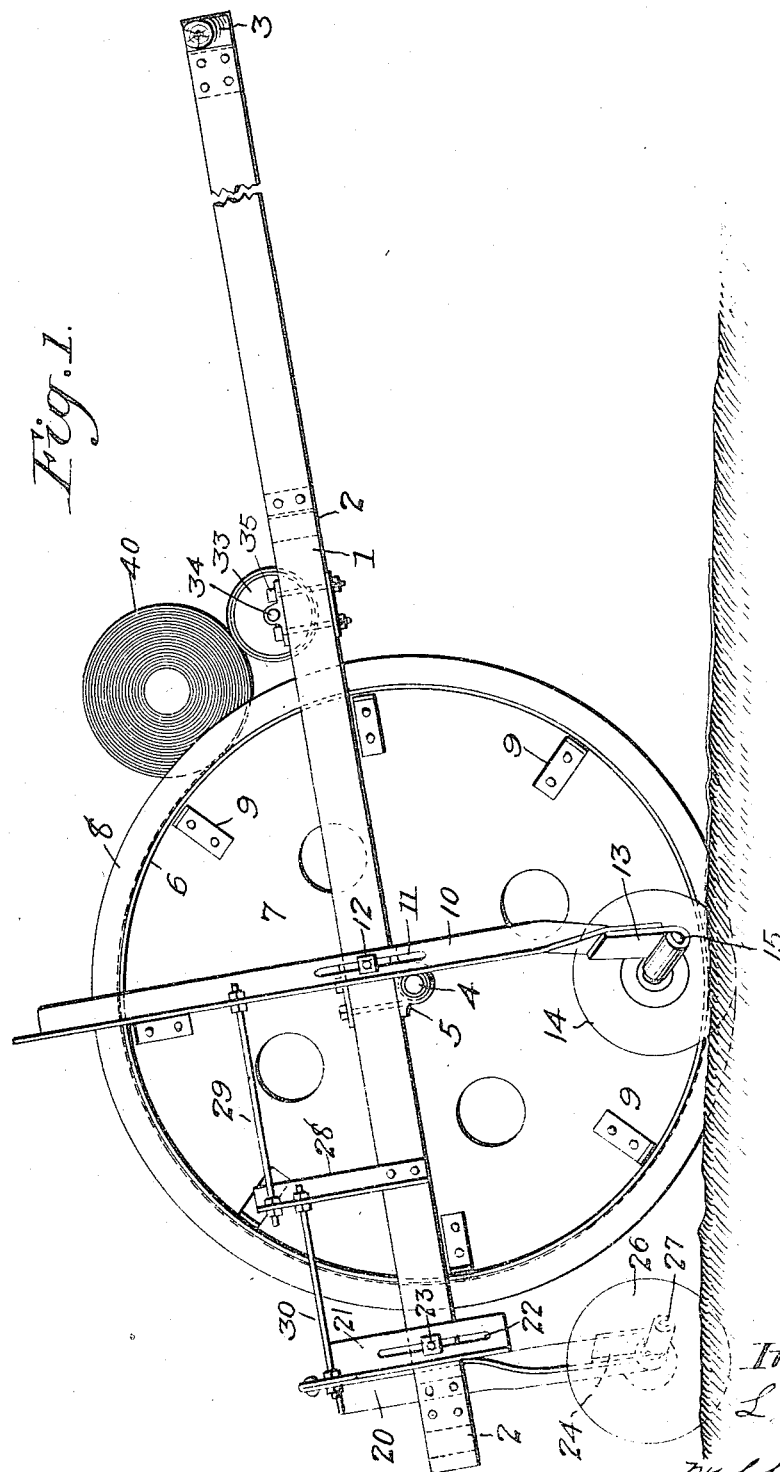
Fig. 1 is a side elevation of a preferred form of the invention.
Figure 2:
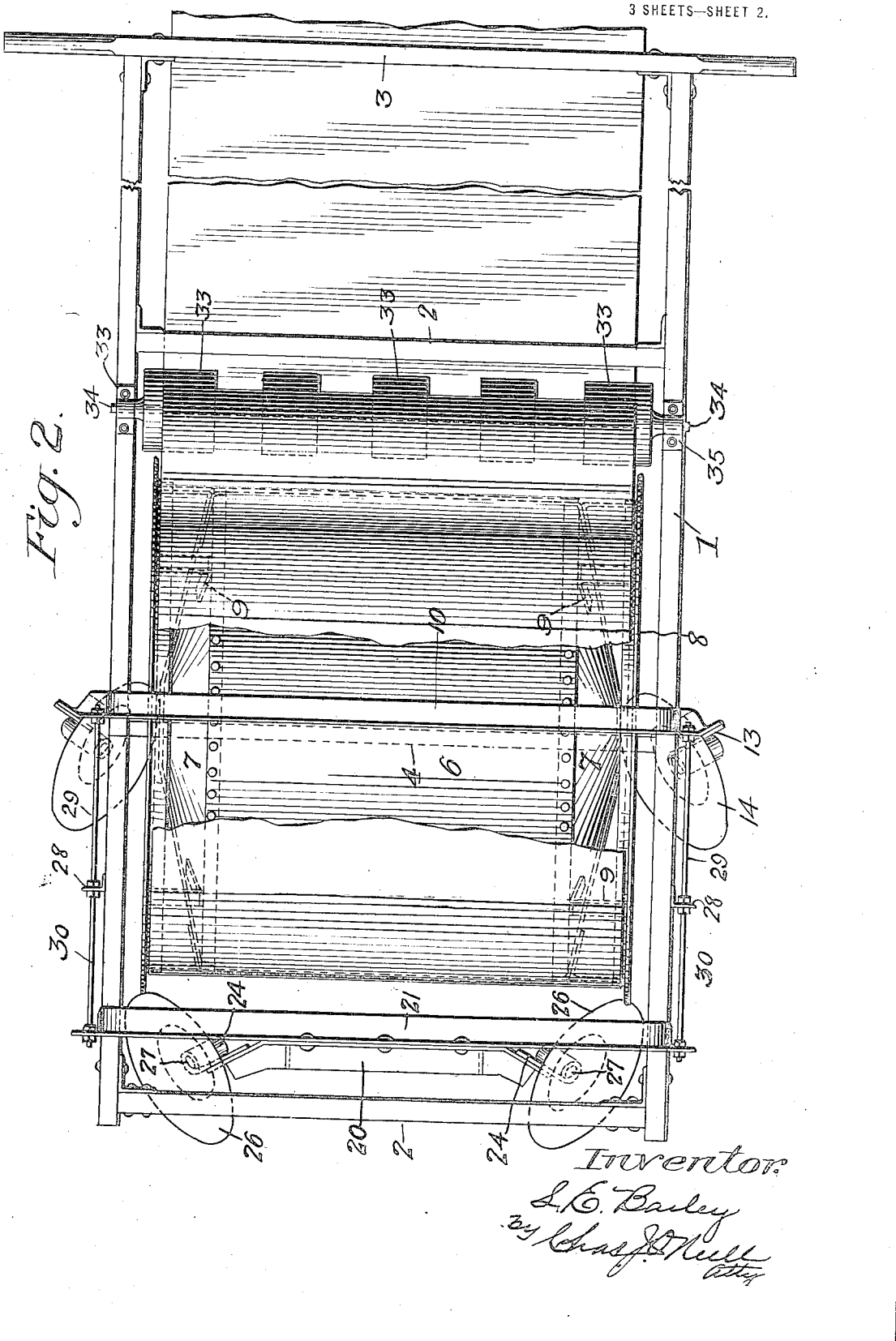
Fig. 2 is a plan view thereof.
Figure 3:
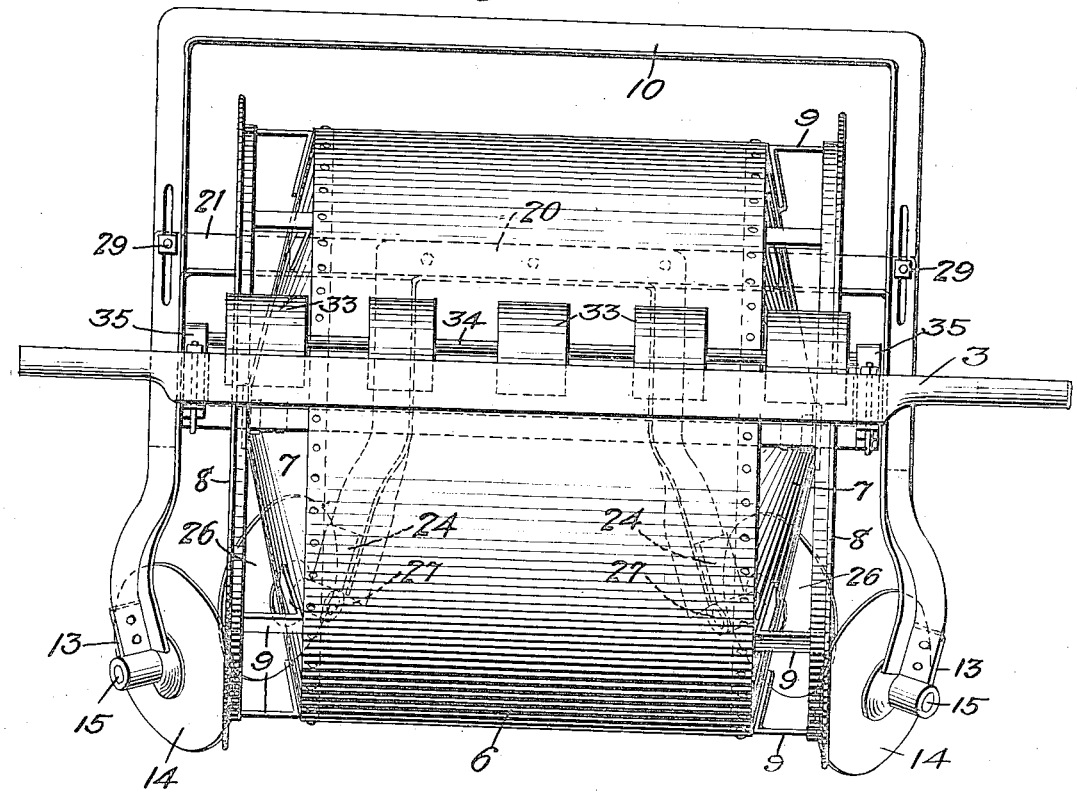
Fig. 3 is an end elevation.

Referring to the drawings, the invention comprises a frame made up of side bars 1, 1, cross-bars 2, 2 and a handle bar 3. Mounted on the side bars 2, 2 in suitable journal bearings 5, 5 is a transverse axle 4 to which is secured a rotary drum which constitutes the supporting element of the machine and is adapted to be rolled over the surface of the prepared soil, said drum comprising a middle cylindrical portion 6, preferably made of sheet metal and having two generally conical or convex ends or heads 7, 7. Secured to each head 7 of the drum, by means of angle brackets 9 is an angular flanged rim 8, one flange of which constitutes a continuation of the cylindrical surface of the roller and the other flange is normal thereto, the rim being spaced from the end of the drum by means of the supporting brackets 9, and the distance between the two rims being substantially equal to the width of the mulching strip, so that the latter is accurately guided by the rims in the operation of laying the mulch, as will be explained later. Adjustably connected to the side bars 1, 1 is a yoke like frame 10 extending over the top of the roller and having pendant arms, to the lower ends of which are connected two brackets 13 provided with journal bearings to receive the pintles 15 of the rotary furrow closing or covering discs 14, which are preferably located on each side of the drum and slightly to the rear of a plane normal to the ground, through the axis of the drum, when the latter is in operative position. The adjustment of the yoke 10 with respect to the frame, which adjustment determines the position of the discs 14 with respect to the surface of the soil, is effected by means of slots 11 within the side arms of the yoke 10, which are engaged by bolts 12 carried by the side bars 1. Connected to the forward ends of the side bars 1, and in advance of the drum, is a yoke 21 having its vertical arms slotted as at 22, whereby the yoke may be adjusted on the frame by means of the bolts 23, in the manner similar to the adjustment of the yoke 10. The two yokes are connected together so as to maintain the proper spaced relation thereof by means of stay bolts 29 and 30 on each side of the machine, and preferably connected to intermediate vertical angle bars 28 fastened to the side bars 1. United to the cross-bar of the yoke 21 is a somewhat narrower yoke 20 formed of an angle bar with the pendant side arms bent laterally and each provided at its lower end with a bearing bracket 24 to receive the pintle 27 of a furrow opening disc 26, the two discs 26 being set at the proper angles to open up shallow furrows in advance of the drum and spaced apart a distance substantially equal to the width of the mulching strip. The relation of these discs to the surfaces of the ground may be regulated by adjusting the yoke 21 on the side bars 1, 1 of the frame. To the rear of the roller and mounted on the side bars 1 is a small roller 33 having a longitudinal shaft 34 engaging journal bearings 35 on each of the side arms 1, said roller 33 serving in conjunction with the cylindrical surface of the main roller to support a roll of mulching fabric 40, as illustrated in Fig. 1.

Figure 4:
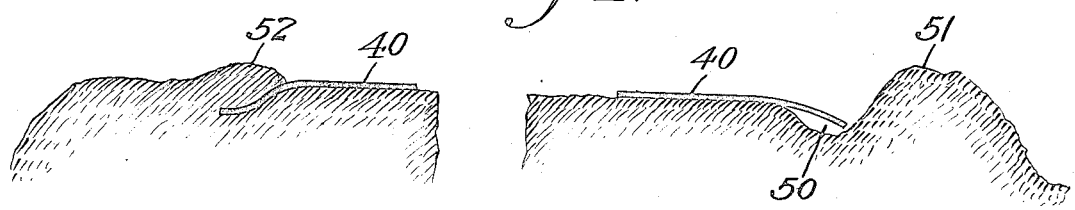
Fig. 4 is a transverse section through an area of the soil illustrating how the mulch is applied and secured in position.

In operating the apparatus, as described, it will be understood that the soil is first thoroughly prepared for planting and is in a very soft and fine workable condition. A roll of the mulching paper is placed in engagement with the surface 6 of the drum and the roller 33, and the end of the mulching strip carried forward over the drum. The machine is then advanced along the row of the prepared soil to be covered by the mulch. The discs 26 on the machine, in advance of the drum, are set at an angle to open relatively shallow furrows on each side of the row, and to throw the soil out in a ridge, such as 51, as illustrated at the right of Fig. 4. The mulching strip is unwound or drawn forward by the drum, as the latter rolls over the soil, and laid smoothly on the surface of the soil, the flanges of the rims 8 serving to accurately guide the mulch in its progress around the drum. As the mulch is laid on the ground by the drum, the lateral edges of the mulching strip overlie the furrows 50, which the discs 26 opened. It will be noted that the discs 14 engage the soil just back of the line of contact of the roller therewith, and, therefore at the points where the mulch first engages the soil, so that the normal operation of the discs 14 is to throw the loose soil, which has been thrown up in the ridges 51 by the furrow-opening discs, back into the furrows and over the lateral edges of the mulching strip. The normal action of the furrow covering discs 14 would be to distribute the loose soil more or less unevenly over the surface of the mulch and also to cause the edge of the paper to fold or crumple, due to lateral pressure. Both of these defects, however, are overcome by the offset rims 8, the flanges of which project a sufficient distance beyond the plane of the mulch to protect the edges against the action of the furrow covering discs, but said discs, on the contrary, throw the loose soil inwardly through the rims 8, and the soil is distributed in a substantially uniform layer along the edges of the mulching strip and between the ends of the drum and the rims 8, the redistributed soil forcing the edges of the mulching strip to the bottom of the furrow and completely covering and securing the edges, as illustrated in 52, in Fig. 4, so that when the operation is complete the mulching strips are laid in close contact with the soil, with each lateral edge effectively imbedded in and sealed by the soil, which is first thrown out by the furrow forming discs 26 and immediately thereafter re-distributed over the edges of the paper by the furrow covering discs. It will be apparent that it is not necessary to form deep furrows or to apply a relatively large amount of the soil to the edges of the mulch, as it is not the weight of the soil which is effective in holding the mulch in place, but the sealing action of the soil which practically locks the longitudinal edges of the mulch within the refilled furrow and prevents the entrance of wind under the edges of the mulch.

Under certain circumstances it will be obvious that it may not be necessary to form furrows ahead of the drum because, if the soil is in proper condition, the discs 14, engaging the soil on each side of the mulching strip, while the latter is in the process of being laid, will throw up a uniform layer or ridge of soil along the edges of the strips. While this mode of operation is satisfactory in some cases, as a general proposition it is desirable to first form the furrows into which the lateral edges of the mulch project and then re-distribute the soil from the furrows over the lateral edges of the mulching strip, as described.

It will also be obvious that the details of the machine may be changed without departing from the broad spirit of the invention. For example, plows, wings or scrapers might be substituted for the discs. Likewise, the machine may be so constructed as to be pulled rather than pushed and may be adapted to be operated by other than hand power, and the machine may be constructed in double or multiple units to lay several rows of mulching strips simultaneously. It not infrequently occurs that the mulching paper is not alike on both sides, and the rolls are not wound in the same manner, so that in the normal operation of the machine some of the strips might be laid wrong side up. In order to adapt the machine for correctly laying the mulches right side up, instead of mounting the mulching roll between the drum and the roller 33, a second roller may be mounted parallel with said roller 33 and the roll of mulching paper mounted on these two idle or supporting rollers, which will admit of the paper being unwound in the opposite direction and with the proper side up. Any or all of these changes may be made without departing from the basic principle of the invention which involves, in a unitary machine, means for laying the mulching strip in contact with the soil and means for distributing a substantially uniform ridge or covering of the soil along the lateral edges of the mulching strip.

What I claim is:

1. A mulch laying machine comprising means for spreading the mulch on the ground, and means for turning the soil adjacent the lateral edges of the mulch over and onto said edges.

2. A mulch laying machine comprising means for spreading the mulch on the ground, means for turning the soil adjacent the lateral edges of the mulch over and onto said edges, and means for limiting the deposited soil to layers of substantially uniform width.

3. A mulch laying machine comprising a frame, a roller carried thereby for spreading the mulch on the ground, and means carried by the frame adjacent the ends of the roller for turning the soil adjacent the lateral edges of the mulch over and onto said edges.

4. A mulch laying machine comprising a frame, a traction roller mounted thereon for guiding and laying the mulch in strip form on the ground, and means carried by the frame adjacent the ends of the roller for turning the soil adjacent the lateral edges of the mulch over and onto said edges.

5. A mulch laying machine comprising means for spreading the mulch on the ground, means in advance of the spreading means for opening furrows in the soil to receive the lateral edges of the mulch, and means for turning the soil from the furrows back over the said lateral edges.

6. A mulch laying machine comprising means for spreading the mulch on the ground, means in advance of the spreading means for opening furrows in the soil to receive the lateral edges of the mulch, means for turning the soil from the furrows back over the said lateral edges, and means for limiting the returned soil to layers of substantially uniform width.

7. A mulch laying machine comprising a frame, a tractor roller mounted thereon for guiding and laying the mulch in strip form on the ground, and plows carried by the frame adjacent the ends of the roller for turning the soil adjacent the lateral edges of the laid mulch over and onto said edges.

8. A mulch laying machine comprising a frame, a tractor roller mounted thereon for guiding and laying the mulch in strip form on the ground, and vertically adjustable plows carried by the frame adjacent the ends of the roller for turning the soil adjacent the lateral edges of the laid mulch over and onto said edges.

9. A mulch laying machine comprising a frame, a tractor roller mounted thereon for guiding and laying the mulch in strip form on the ground, plows carried by said frame in advance of said roller to open furrows in the soil to receive the lateral edges of the mulch, and plows carried by the frame adjacent the ends of the roller for turning the soil adjacent the lateral edges of the laid mulch over and onto said edges.

10. A mulch laying machine comprising a frame, a tractor roller mounted thereon for guiding and laying the mulch in strip form on the ground, vertically adjustable plows carried by said frame in advance of said roller to open furrows in the soil to receive the lateral edges of the mulch, and vertically adjustable plows carried by the frame adjacent the ends of the roller for turning the soil adjacent the lateral edges of the laid mulch over and onto said edges.

11. A mulch laying machine comprising a frame, a tractor roller mounted thereon for guiding and laying the mulch in strip form on the ground, and disc plows carried by the frame adjacent the ends of the roller for turning the soil adjacent the lateral edges of the laid mulch over and onto said edges.

12. A mulch laying machine comprising a frame, a tractor roller mounted thereon for guiding and laying the mulch in strip form on the ground, disc plows carried by said frame in advance of said roller to open furrows in the soil to receive the lateral edges of the mulch, and disc plows carried by the frame adjacent the ends of the roller for turning the soil adjacent the lateral edges of the laid mulch over and onto said edges.

13. A mulch laying machine comprising a frame, a roller carried thereby for spreading the mulch on the ground, flanged rims attached to and spaced from the ends of the drums, and means carried by the frame adjacent to the ends of the roller for turning the soil adjacent the lateral edges of the mulch over and onto said edges.

14. A mulch laying machine comprising a frame, a roller carried thereby for spreading the mulch on the ground, rims attached to and spaced from the ends of the drums, each rim including a flange constituting a continuation of the drum surface and a flange normal thereto, and means carried by the frame adjacent to the ends of the roller for turning the soil adjacent the lateral edges of the mulch over and onto said edges.

In testimony whereof I affix my signature.

LESLIE E. BAILEY.